(12) United States Patent
Hind et al.

(10) Patent No.: US 7,490,114 B2
(45) Date of Patent: *Feb. 10, 2009

(54) SYSTEM AND METHOD FOR SYNCHRONIZING DATA RECORDS BETWEEN MULTIPLE DATABASES

(75) Inventors: Hugh Hind, Georgetown (CA); Craig Dunk, Guelph (CA)

(73) Assignee: Research In Motion Limited, Waterloo (CA)

( * ) Notice: Subject to any disclaimer, the term of this patent is extended or adjusted under 35 U.S.C. 154(b) by 479 days.

This patent is subject to a terminal disclaimer.

(21) Appl. No.: 10/990,014

(22) Filed: Nov. 16, 2004

(65) Prior Publication Data

US 2005/0071358 A1    Mar. 31, 2005

Related U.S. Application Data

(63) Continuation of application No. 09/545,964, filed on Apr. 10, 2000, now Pat. No. 6,820,088.

(51) Int. Cl.
*G06F 17/30* (2006.01)
*G06F 12/00* (2006.01)

(52) U.S. Cl. ..................... 707/204; 707/202; 707/203

(58) Field of Classification Search ............... 707/200, 707/203, 204; 455/426.1, 412.2, 414.1, 466; 709/206, 246
See application file for complete search history.

(56) References Cited

U.S. PATENT DOCUMENTS

| | | | |
|---|---|---|---|
| 5,649,195 A * | 7/1997 | Scott et al. .................. 707/201 |
| 5,684,990 A | 11/1997 | Boothby | |
| 5,806,074 A | 9/1998 | Souder et al. | |
| 5,878,434 A | 3/1999 | Draper et al. | |
| 5,924,094 A | 7/1999 | Sutter | |
| 5,924,096 A | 7/1999 | Draper et al. | |
| 5,926,816 A | 7/1999 | Bauer et al. | |
| 5,943,676 A | 8/1999 | Boothby | |
| 5,987,575 A * | 11/1999 | Yamaguchi .................. 711/162 |
| 6,034,621 A | 3/2000 | Kaufman | |
| 6,073,140 A * | 6/2000 | Morgan et al. ............... 707/203 |
| 6,141,664 A | 10/2000 | Boothby | |
| 6,167,407 A * | 12/2000 | Nachenberg et al. ......... 707/203 |
| 6,202,060 B1 | 3/2001 | Tran | |
| 6,247,135 B1 | 6/2001 | Feague | |
| 6,295,541 B1 | 9/2001 | Bodnar et al. | |
| 6,308,201 B1 | 10/2001 | Pivowar et al. | |
| 6,343,299 B1 * | 1/2002 | Huang et al. ................. 707/203 |
| 6,373,834 B1 | 4/2002 | Lundh et al. | |
| 6,463,427 B1 | 10/2002 | Wu | |

(Continued)

OTHER PUBLICATIONS

Mohan et al. Data base recovery in shared disks and client-server architecture, Distributed Computing System 1992, pp. 310-317, Jun. 9-12, 1992.*

(Continued)

*Primary Examiner*—Baoquoc N. To
(74) *Attorney, Agent, or Firm*—Jones Day; Krishna K. Pathiyal; Robert C. Liang (57) ABSTRACT

First and second pairs of synchronization parameters are stored in first and second databases. The first and second pairs are compared upon a data record being updated in either database to determine whether a synchronization conflict has occurred and a corresponding synchronization operation is executed.

6 Claims, 9 Drawing Sheets

U.S. PATENT DOCUMENTS

| | | | |
|---|---|---|---|
| 6,466,609 | B2 | 10/2002 | Koslar et al. |
| 6,493,727 | B1 | 12/2002 | Huang et al. |
| 6,516,327 | B1 | 2/2003 | Zondervan et al. |
| 6,947,738 | B2 * | 9/2005 | Skog et al. ............... 455/426.1 |
| 2003/0140050 | A1 | 7/2003 | Li et al. |

OTHER PUBLICATIONS

Porto et al. Persistent object synchronization with active relational Databases, Technology of Object-Oriented language and System, 1999 Proceedings, pp. 53-62, Aug. 1-5, 1999.*

Eatherton et al. Tree bitmap: haradware/software IP lookups with incremental updates, ACM SIGCOMM, Computer Communication Review, vol. 34, Issue. 2, pp. 97-122, Apr. 2004.*

Ganeriwal et al.: "Timing-Sync Protocol for Sensor Networks," SenSys '03, Nov. 5-7, 2003, ISBN: 1-58113-707-9, pp. 138-149, Los Angeles, California, USA.

Tyukin et al.: "On the Choice of Coupling in a System of Coupled Maps: Structured Implies Features," PhysCon 2003, Aug. 20-22, 2003, vols. 2, pp. 555-562, St. Petersburg, Russia.

Panayiotopoulos: "Unified Algebraic Treatment of Synchronization Parameters Estimation," Jun. 11-14, 2004, vol. 8, pp. 2530-2534, Peania Attika, Greece.

Kanbara et al.: "A Stereoscopic Video See-Through Augmented Reality System Based on Real-Time Vision-Based Registration," Mar. 18-22, 2000, pp. xx-302 (8 pgs), Nara, Japan.

* cited by examiner

SYSTEM AND METHOD FOR SYNCHRONIZING DATA RECORDS BETWEEN MULTIPLE DATABASES

This application is a continuation of U.S. patent application Ser. No. 09/545,964, filed on Apr. 10, 2000, now U.S. Pat. No. 6,820,088, the entire disclosure of which is incorporated herein by reference.

BACKGROUND OF THE INVENTION

1. Technical Field

The present invention is directed toward the field of synchronizing data records stored in a plurality of electronic databases. More specifically, the invention provides a system and method for synchronizing data records between multiple databases in which a plurality of synchronization parameters are appended to data records stored in the databases so that the synchronization and subsequent conflict resolution processes can be accomplished in an efficient manner. The invention is particularly useful in a wireless environment in which data records are synchronized between one or more Host systems coupled to a wired network and a portable data communication Device coupled to a wireless network.

2. Description of the Related Art

Data record synchronization systems are known in this field. Generally, these systems utilize a single "change number" for maintaining synchronicity between data records stored on multiple databases. The change number is initially synchronized to a particular value (such as 1) when the records are stored to the databases. If the record is changed at one of the databases, the change number at that database is incremented, and a message is sent to the other databases indicating that a change has occurred to the particular data record.

The problem with these known synchronization systems is that when a conflict occurs (i.e., the same data record is simultaneously updated at more than one database), there must be multiple (usually at least three) exchanges of information between the databases in order to resolve the conflict. For example, consider a typical synchronization process between two databases—A and B. A data record is updated at database A. Database A then transmits an update message to database B indicating that the particular record has been updated. Database B examines the update message (which typically includes the change number associated with the data record at Database A, and the new data record), and either accepts the update or rejects it depending upon whether a conflict has occurred. If Database B accepts the update, then it sends an acknowledgement message back to Database A indicating the change has been accepted. It Database B rejects the update, then a negative acknowledgement message is sent to Database A. Database A then sends a formal acknowledgement back to Database B indicating that it received the message from Database B. This typifies the traditional three-way handshake used in present synchronization systems.

This type of synchronization process is particularly problematic in the wireless field where high transmission latency is the norm, and thus conflicts between databases are very likely. For this type of system, the standard three-way synchronization process is inefficient and inadequate for maintaining synchronicity between data records, and for resolving conflicts between multiple updates to the same data record.

Therefore, there remains a general need in this field for a system and method for synchronizing data records between multiple databases in which conflicts can be efficiently resolved.

SUMMARY OF THE INVENTION

A system and method for synchronizing data records between multiple databases is provided. Each database includes data records that are modified to include at least one pair of synchronization parameters. In a two-database system including a first database and a second database, each data record is modified to include synchronization parameters for both the first and second databases. When an update is made to a data record at one of the databases, an update message is transmitted to the other database including both synchronization parameters from the database where the update is made, along with the updated data record. An efficient master-slave configuration between the databases then enables either database to resolve conflicts without further communications. The system and method scale to systems having more than two databases by modifying the data records in at least one of the databases to include a pair of synchronization parameters for each of the other databases to which it is being synchronized, and by providing a multi-level master-slave configuration.

Conflicts that occur during the synchronization process are resolved in the present invention without user interaction using an efficient "one side wins" model in which one of the databases is selected as the "master" database, and the remaining databases are "slaves" to changes that occur at the master. For systems with more than two databases taking part in the synchronization method, multiple levels of "slave" databases may be implemented.

According to one aspect of the invention, a method of synchronizing data records stored in a first and second database is provided. The method includes the following steps: (1) associating a pair of synchronization parameters with each data record stored in the first and second databases, the pair including a first synchronization parameter associated with the first database, and a second synchronization parameter associated with the second database; (2) updating a data record at the first database; (3) incrementing the first synchronization parameter associated with the updated data record at the first database; (4) transmitting a first update message from the first database to the second database, the first update message including the incremented first synchronization parameter, the second synchronization parameter, and the updated data record from the first database; (5) receiving the first update message at the second database; and (6) updating the data record at the second database using the information from the first update message.

According to another aspect of the invention, a method of synchronizing data records stored in a host system and a portable data communication device is provided, comprising the steps of: associating a first device synchronization parameter and a first host synchronization parameter with the data records stored at the host system; associating a second device synchronization parameter and a second host synchronization parameter with the data records stored at the device; if a data record is updated at the host system, then updating the first host synchronization parameter, and transmitting a first update message to the device; and if a data record is updated at the device, then updating the second device synchronization parameter, and transmitting a second update message to the host.

Another aspect of the invention provides a data record synchronization system, comprising: a host system coupled to a host database, wherein the host database stores data records that have been modified to include a first host synchronization parameter and a first device synchronization parameter; a portable data communication device coupled to a device database, wherein the device database stores data records that have been modified to include a second host synchronization parameter and a second device synchronization parameter; a network coupling the host system to the portable data communication device; software operating at the host system for updating a data record and for generating a first update message that is transmitted to the device when a data record is updated at the host, the first update message including the first host synchronization parameter, the first device synchronization parameter, and the updated data record stored at the host system; and software operating at the portable data communication device for updating a data record and for generating a second update message that is transmitted to the host when a data record is updated at the device, the second update message including the second host synchronization parameter, the second device synchronization parameter, and the updated data record stored at the device.

It should be noted that these are just some of the many aspects of the present invention. Other aspects not specified will become apparent upon reading the detailed description of the preferred embodiments, set forth below. The following drawings and description of the preferred embodiments are to be regarded as illustrative in nature and not restrictive.

DETAILED DESCRIPTION OF THE DRAWINGS

Figure 1:
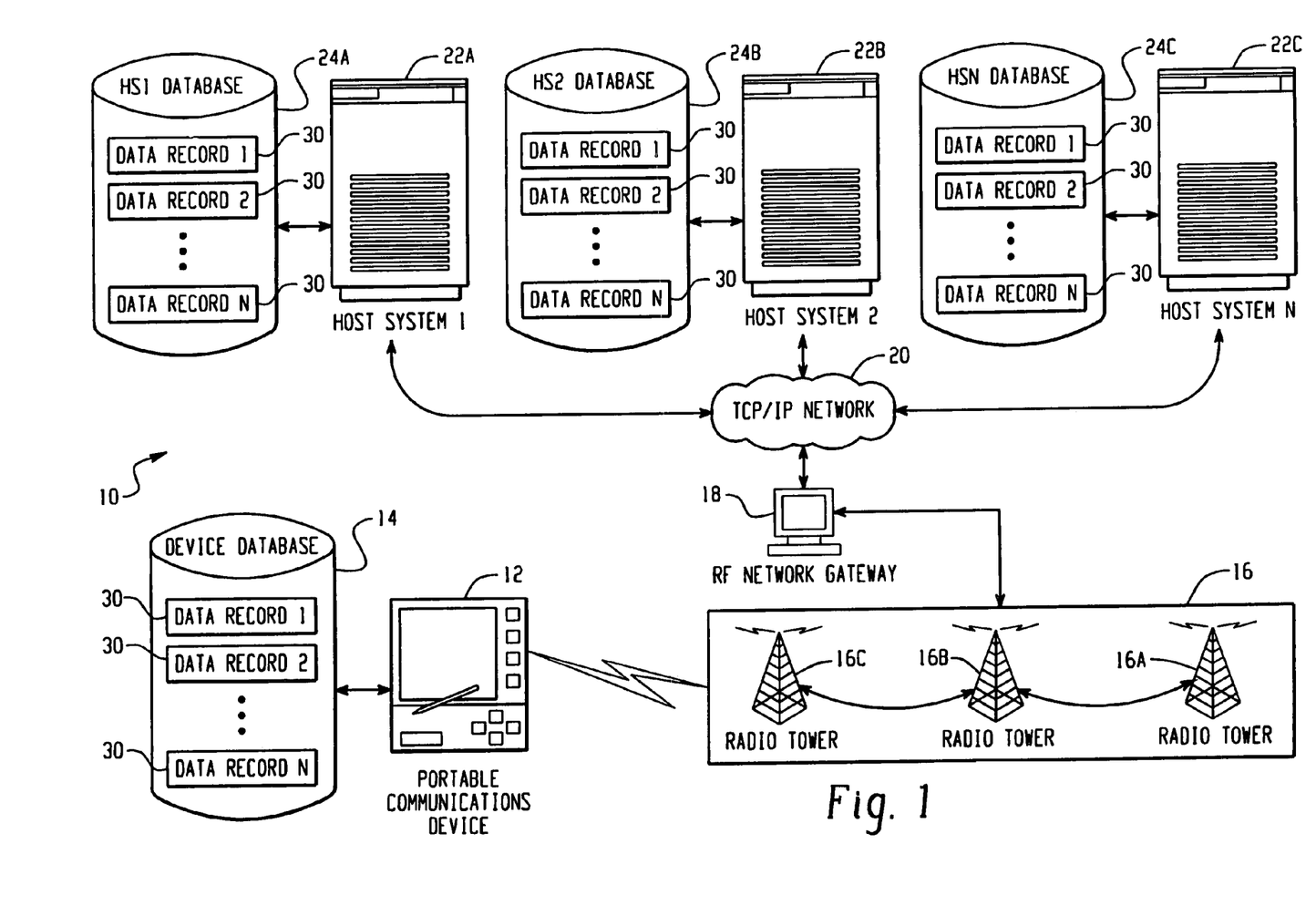
FIG. 1 is a diagram of a preferred system for synchronizing data records between a plurality of Host systems and a portable data communication Device via a wireless network.

Turning now to the drawing figures, FIG. 1 is a diagram of a preferred system 10 for synchronizing data records between one or more Host systems ("Hosts") 22A, 22B, 22C and a portable data communication Device ("Device") 12 via a wireless network. Each of the Host systems 22A, 22B, and 22C include a corresponding Host database 24A, 24B, and 24C. A plurality of data records 30 are stored within these Host databases 24A, 24B, 24C. Likewise, the portable data communication Device 12 includes a Device database 14 preferably comprising the same data records 30 that are stored within the one or more Host system databases 24A, 24B, 24C.

In the preferred environment shown in FIG. 1, the one or more Host systems 22A, 22B, 22C are in communication with the portable communications Device 12 via a TCP/IP network 20, such as the Internet, and a radio network 16. The radio network preferably includes a plurality of radio towers 16A, 16B, 16C, base station electronics, control centers, etc., for communicating RF messages to and from the portable communications Device 12. An example of such an RF network is the Mobitex packet data radio network, although the principles of the present invention can be used with any type of wireless or wireline network in which it is desirable to synchronize data records between multiple databases. Because of the latency involved in communications over a wireless network, however, the present invention is particularly useful in this environment. The wireless network 16 is coupled to the TCP/IP network 20 via an RF network gateway 18, which provides a two-way interface between the two networks 20, 16.

The portable data communication Device (Device) can take many forms. The preferred form of the Device is a two-way paging communicator, such as the Blackberry or Proton pagers manufactured by Research In Motion of Waterloo, Ontario. This type of Device is described in more detail in co-pending application Ser. Nos. 09/106,585 and 09/344,432, titled "Hand Held Messaging Device with Keyboard", both of which are assigned to the assignee of the present invention. The teaching of these co-pending applications is hereby incorporated into this application by reference. Although a two-way paging communicator is the preferred Device, any type of remote computing Device having a database can be used with the present invention, whether the Device is wireless or not. Example Devices that may be utilized with the present invention include: one, one-and-one-half, and two-way pagers, PDAs, palmtops, laptops, cellphones, web-phones, electronic tablets, thin clients, net appliances, etc.

As shown in FIG. 1, and described in more detail below, the present invention preferably includes hardware, software and data structures for enabling the synchronization of data records between a plurality of databases. In the preferred embodiment shown in FIG. 1, the hardware includes at least one Host system 22A coupled to a Host database 24A and at least one portable communication Device 12 coupled to a Device database 14. Associated data structures including a plurality of modified data records 30 are stored in the databases 24A, 14. Software executing at the portable Device 12 and the Host system 24A enables the data record synchronization and conflict resolution processes described below in connection with FIGS. 3-9.

Figure 2A:
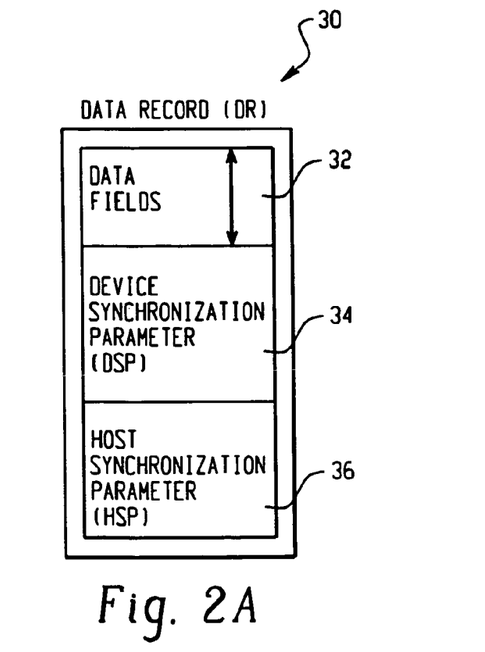
FIG. 2A is a schematic of a data record modified to operate in accordance with an embodiment of the present invention in which data records are synchronized between one Host system and a portable data communication Device.

FIG. 2A is a schematic of a data record ("DR") 30 modified to operate in accordance with an embodiment of the present invention in which data records are synchronized between one Host system 22A and a portable data communication Device 12. These data records (DR) are stored in the Host database 24A and the Device database 14, and include a plurality of data fields 32. For example, the database could be an electronic calendar database, as is commonly associated with calendar software such as Microsoft Outlook and Lotus Organizer. The data records (DR) represent individual calendar entries in this example, and the data fields represent the specific information associated with the particular calendar entry.

In this example, the user of the Device 12 may be updating the calendar entries (i.e., data records) at the Device database 14 while on the road away from their office computer (i.e., Host system 22A), and at the same time the user's assistant may be making updates to the calendar entries at the Host database 24A. As described in more detail below in connection with FIGS. 3-9, the present invention provides a mechanism for ensuring that the correct calendar entries are synchronized between the Host system and the Device, even in the situation where there are multiple (and near simultaneous) updates to the same data record.

As shown in FIG. 2, one embodiment of the present invention includes a modified data record structure 30 stored at the Host system database 24A and the Device database 14. This modified data record structure 30 includes a plurality of data fields 32, which are the same data fields that are normally associated with the unmodified data record, and at least two synchronization parameters that are appended to the data record—a Device synchronization parameter (DSP) 34, and a Host synchronization parameter (HSP) 36. The software included with the present invention modifies the data records that are being synchronized by the system 10 to include the DSP 34 and HSP 36. The DSP 34 is a parameter, associated with the Device, which keeps track of the current version of the modified data record 30 stored at the Device database 14. Likewise, the HSP 36 is a parameter, associated with the Host 22A, which keeps track of the current version of the modified data record 30 stored at the Host database 24A. Preferably, these parameters DSP 34, HSP 36 are integer counters that are initialized to the value "1" when the data record 30 is first created and synchronized between the Host 22A and the Device 12.

Having established this modified data structure 30, whenever the data record is updated at the Device 14, the appended DSP 34 is incremented by "1." Likewise, if the data record 30 is updated at the Host system 22A, then the HSP 36 is incremented by "1." As described in more detail below, when either the Device 14 or the Host 22A makes an update to a particular data record 30, an update message is transmitted in order to synchronize the Device 12 to the Host system 22A, or vice versa. This update message would include the current DSP, HSP, and the updated data record 30. By utilizing a plurality of synchronization parameters, the present invention is able to provide data record synchronization utilizing a single communication between the databases being synchronized.

Figure 2B:
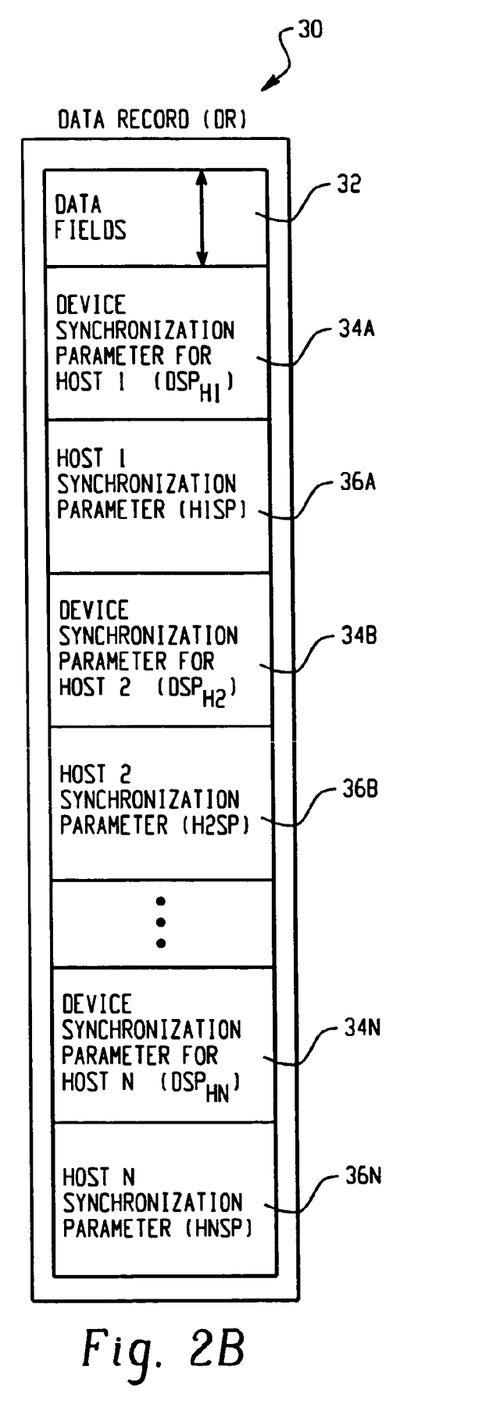
FIG. 2B is a schematic of a data record modified to operate in accordance with another embodiment of the present invention in which data records are synchronized between a plurality of Host systems and a portable data communication Device.

FIG. 2B is a schematic of a data record modified to operate in accordance with another embodiment of the present invention in which data records 30 are synchronized between a plurality of Host systems 22A, 22B, 22C and a portable data communication Device 12. Unlike FIG. 2A, however, this modified data record 30 has a different structure depending upon whether it is stored at one of the Host systems 22A, 22B, 22C or the Device 12. FIG. 2B shows the structure of the modified data record 30 stored at the Device 12. Because in this embodiment the Device 12 is being synchronized to multiple Host systems 22A, 22B, 22C, the data record 30 is modified to include a DSP/HSP pair 34, 36 for each Host system.

Thus, for example, if the Device 12 is being synchronized to two Host systems (Host 1 and Host 2), the modified data record 30 stored at the Device would include a Device synchronization parameter for Host 1 ($DSP_{H1}$) 34, a Host 1 synchronization parameter (H1SP) 36, a Device synchronization parameter for Host 2 ($DSP_{H2}$) 34, and a Host 2 synchronization parameter (H2SP) 36. The synchronization pair $DSP_{H1}$/H1SP are used to synchronize the Device 12 to Host 1, and the synchronization pair $DSP_{H2}$/H2SP are used to synchronize the Device to Host 2.

For the two Host systems—Host 1 and Host 2—the modified data record would include only the synchronization pair associated with the particular Host system. Thus, for example, the Host 1 modified data record would only need to include the synchronization pair $DSP_{H1}$/H1SP appended to the data fields, and would not need the synchronization pair for Host 2—$DSP_{H2}$/H2SP.

Figure 3:
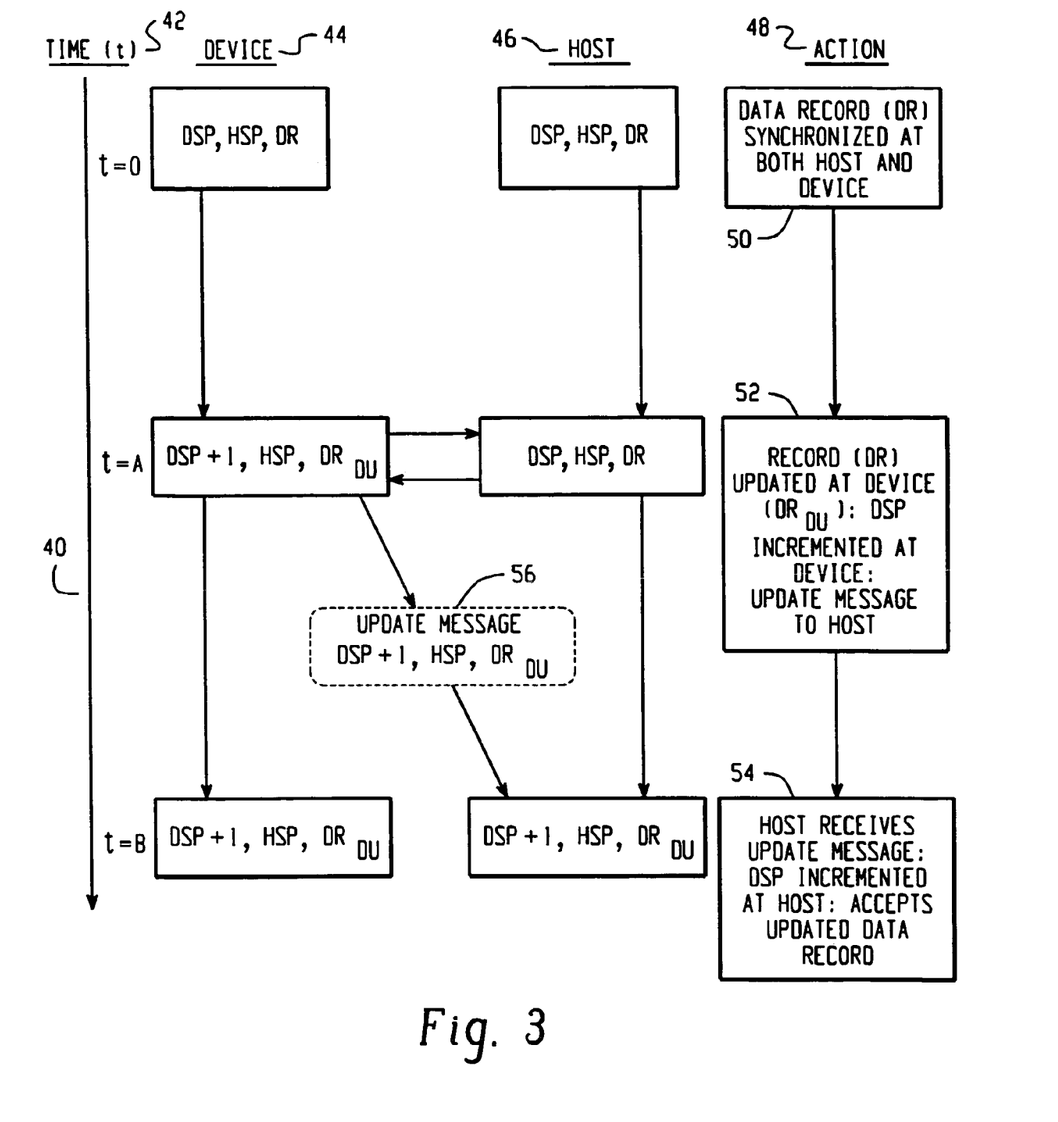
FIG. 3 is a timing flow diagram showing a method of data record synchronization between a Host system and a portable data communication Device, wherein the data record is updated at the portable data communication Device.

FIG. 3 is a timing flow diagram 40 showing a method of data record synchronization between a single Host system 22A and a portable data communication Device 12, wherein the modified data record 30 is updated at the portable data communication Device 12.

The structure of all the timing flow diagrams in this application include three columns organized into a plurality of rows. The first column 44 shows the modified data record 30 at the Device database 14. The second column 46 shows the modified data record 30 at the Host system database 24A. And the third column 48 describes the actions taken by the software operating at the Host system 22A and the Device 12 during the synchronization and conflict resolution processes described below. A timing scale 42 is set forth on the left-hand side of the flow diagrams, and is organized from top to bottom, such that the flow of actions taken by the software and the corresponding status of the modified data records begins at the top of the figure, where t=0, and proceeds towards the bottom of the figure, where t=B or t=C.

Turning back to FIG. 3, at step 50 the modified data record 30 to be updated is synchronized at both the Host 22A and the Device 14. This record 30 may have been previously synchronized between the Host 22A and the Device 14 using a wired synchronization cradle, as is commonly used in synchronizing portable Devices to Host systems, or it may have been synchronized by a wireless transmission.

In any event, at time t=0, the Device 12 and Host 22A both store the same Device synchronization parameters (DSP), Host synchronization parameters (HSP), and data record fields (DR). At time t=A, the data record is updated at the Device 12. When this happens, the software operating at the Device 12 creates a new, updated version of the data record by modifying or adding to the data fields 32 in some manner, thereby creating an updated data record—$DR_{DU}$. At the same time, the Device 12 software increments the DSP at the Device so that it is now the value DSP+1. Whenever a data record is updated at the Device (or at the Host), an update message 56 is generated by the synchronization software. At time t=A, when the record is updated at the Device 12 to $DR_{DU}$, the Device software then generates an update message 56, including the updated DSP parameter (DSP+1), the HSP parameter (HSP), and the updated data record ($DR_{DU}$), and transmits this update message 56 to the Host system 22A to indicate that an update has occurred.

At time t=B, the Host 22A receives the update message 56 from the Device 12. At step 54, the Host synchronization software then compares the HSP value from the update message 56 to the HSP value stored at the Host database 24A for the particular data record that was modified by the Device. If the HSP values do not match, then a conflict has occurred, and, depending on whether the Host 22A or the Device 12 is designated as the master (as opposed to a slave), the Host may or may not accept the changes from the update message 56. This conflict resolution process is described in more detail below. Assuming for purposes of FIG. 3 that the HSP values match, the Host 22A would then accept the changes from the update message 56, store the updated data record $DR_{DU}$ at the Host database 24A, and increment the DSP value to DSP+1. The data record 30 is then synchronized at the Device 12 and the Host system 22A.

If the Host 22A had made the update to the data record 30 at step 52 instead of the Device 12, then the HSP value at the Host would have been incremented to HSP+1 at the Host database, the data record would have been overwritten with the new, updated data record $DR_{HU}$, and an update message would have been transmitted from the Host 22A to the Device 12. This update message would have included the DSP value from the Host (DSP) the HSP value from the Host (HSP+1), and the updated data record $DR_{HU}$. Assuming no conflict was detected by the Device software, the Device would have then accepted the update message from the Host in the same manner that the Host 22A accepted the update message from the Device 12.

Figure 4:
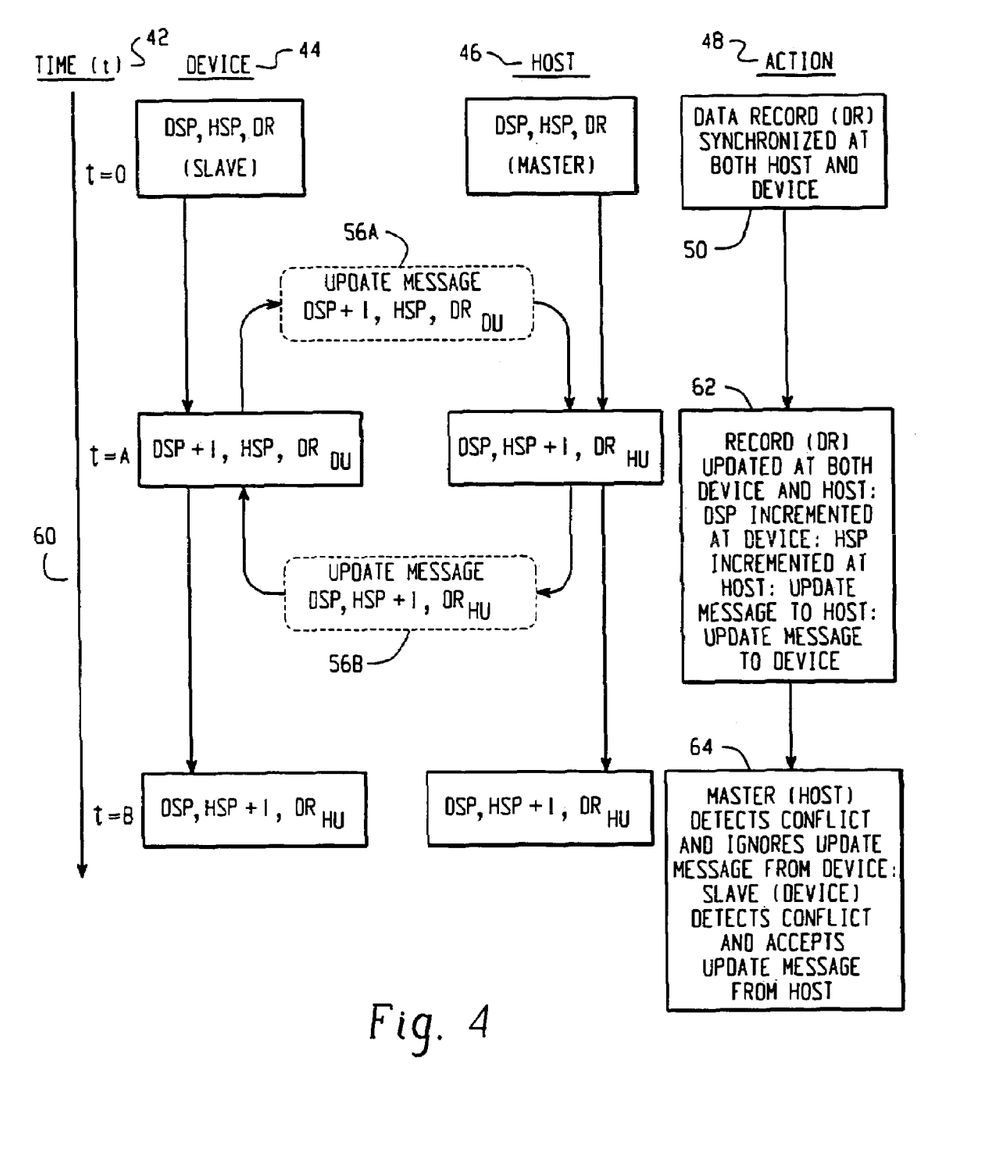
FIG. 4 is a timing flow diagram showing a method of data record synchronization and conflict resolution between a Host system and a portable data communication Device, wherein the data record is simultaneously updated at both the Host system and the portable data communication Device.

FIG. 4 is a timing flow diagram showing a method of data record synchronization and conflict resolution between a Host system 22A and a portable data communication Device 12, wherein a particular modified data record 30 is simultaneously updated at both the Host system 22A and the portable data communication Device 12. This is the conflict situation. It can occur when either the Host 22A or Device 12 makes a change to a particular data record 30 before the update message is received from the Device 22A or the Host 12, thereby resulting in a conflict because the synchronization parameters (DSP, HSP) are now out of synchronization. The present invention overcomes this problem by the use of a user-selectable master-slave architecture in which the user of the system designates either the Device 12 or one of the Hosts 22A, 22B, 22C as the master. If one of the Hosts is selected as the master, then the Device is a first level slave that performs conflict resolution based on an update message from the master Host, and the other Hosts (to the extent there are any) are second level slaves that perform conflict resolution based on an update message from the Device 12. Thus, in a system with multiple Hosts, there are two levels of slaves, the Device being the first level that slaves off the master Host, and the other Hosts being the second level that slave off the Device. If the Device is the master, however, then all of the Hosts are first level slaves that perform conflict resolution based on an update message from the Device, and there are no second level slaves.

Turning back to FIG. 4, at time t=0, the data record 30 to be updated is synchronized at both the Host system database 24A and the Device database 14. Prior to this step, however, the user of the system has designated (through the software operating at the Host and the Device) the Host as the system master, and the Device as the system slave. Thus, if there is a conflict between a particular data record being updated on the Device 12 and the Host 22A, the Host will control.

At step 62, a particular data record 30 is updated at both the Device (slave) 12 and the Host (master) 22A. At the Device 12, the DSP value is incremented to DSP+1, and the data record (DR) is updated to $DR_{DU}$. A first update message 56A including the new Device synchronization parameter (DSP+1), the Host synchronization parameter (HSP) stored at the Device 12, and the updated data record $DR_{DU}$ from the Device is transmitted to the Host 22A. Simultaneously at the Host, the HSP value is incremented to HSP+1, and the data record (DR) is updated to $DR_{HU}$. A second update message 56B including the new Host synchronization parameter (HSP+1), the device synchronization parameter stored at the Host (DSP), and the updated data record $DR_{HU}$ from the Host is transmitted to the Device 12.

At step 64, the Device 12 receives the second update message 56B from the Host 22A, and the Host 22A receives the first update message 56A from the Device 12, thus creating a conflict as to the particular data record that was simultaneously updated. The Host 22A, which was previously designated as the master, examines the HSP value transmitted in the update message 56A from the Device 12 and determines that there is a conflict since the HSP value stored at the Host 22A is greater than the HSP value transmitted in the update message 56A from the Device 12. Because the Host 22A has been designated as the master, the Host 22A will simply ignore the conflicting update message 56A from the Device 12. Conversely, the Device 12, which was previously designated as the slave, examines the DSP value transmitted in the update message 56B from the Host 22A and determines that there is a conflict since the DSP value stored at the Device 12 is greater than the DSP value transmitted in the update message 56B from the Host 22A. Because the Device 12 has been designated as the slave, the Device 12 will then accept the updated data record from the Host—$DR_{HU}$—and will decrement the stored DSP value at the Device 12 so that it is the same value as the DSP value transmitted in the update message. Thus, the conflict has been resolved and the Host 22A and the Device 12 are synchronized based on the update message 56B from the Host 22A.

Figure 5:
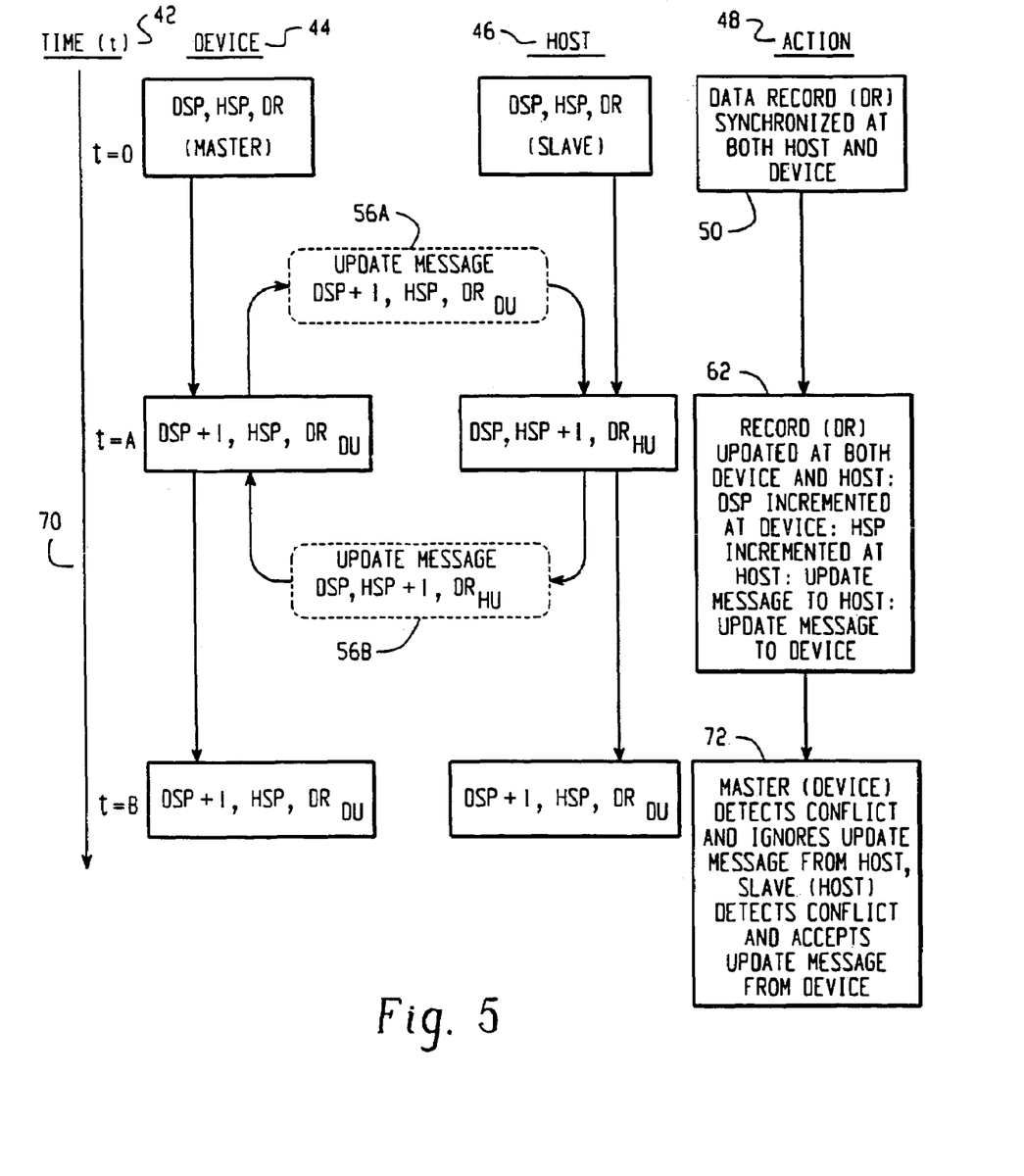
FIG. 5 is a timing flow diagram showing another method of data record synchronization and conflict resolution between a Host system and a portable data communication Device, wherein the data record is simultaneously updated at both the Host system and the portable data communication Device.

FIG. 5 is a timing flow diagram 70 showing another method of data record synchronization and conflict resolution between a Host system 22A and a portable data communication Device 12, wherein the data record is simultaneously updated at both the Host system 22A and the portable data communication Device 12. In this figure, the Device 12 is designated as the master, and the Host system 22A is the slave. The sequence of actions shown in FIG. 5 are identical to that shown in FIG. 4, except that because the Device is the master, and thus controls in any conflict situation, at time t=B (step 72) the net result is that the update message from the Device 56A is accepted by the Host, and the updated Device record from the Device ($DR_{DU}$) is written to the Host database 24A. In addition, the Host 22A decrements the HSP value to be consistent with the HSP value contained in the update message 56A from the Device master 12.

Figure 6:
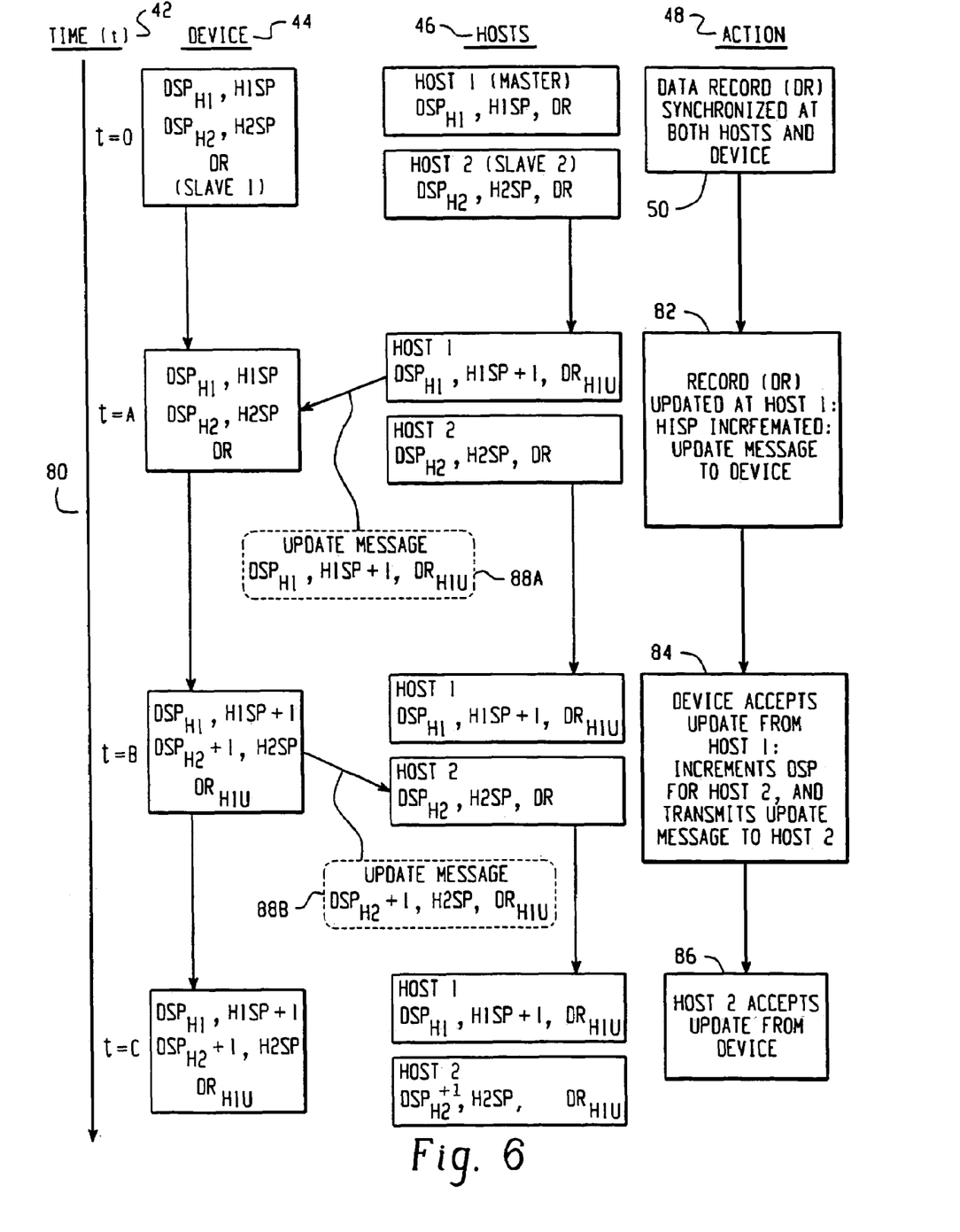
FIG. 6 is a timing flow diagram showing a method of data record synchronization between a plurality of Host systems and a portable data communication Device, wherein the data record is updated at the master Host system.

FIG. 6 is a timing flow diagram showing a method of data record synchronization between a plurality of Host systems 22A, 22B, 22C and a portable data communication Device 12, wherein the data record 30 is updated at the master Host system. As noted above, in the embodiment of the invention where more than one Host system is being synchronized to the Device 12, it is useful to have a two-level master-slave architecture in which one of the Hosts (Host 1) is the master, the Device 12 is the first level slave, and the remaining Host(s) (Host 2) is(are) the second level slave(s). Such a configuration is shown in FIG. 6.

When the Device 12 is being synchronized to more than one Host system (Host 1, Host 2), the data structure shown in FIG. 2B is used to store modified data records 30 at the Device 12. Thus, in the configuration shown in FIG. 6, the Device 12 includes modified data records 30 that include the data fields (DR) from the unmodified data record, a Device/Host synchronization parameter pair for Host 1 ($DSP_{H1}$/H1SP), and a Device/Host synchronization parameter pair for Host 2 ($DSP_{H2}$/H2SP). The Hosts, however, only need one pair of synchronization parameters. Thus, Host 1 22A includes modified data records having the Device/Host synchronization parameter pair for Host 1 ($DSP_{H1}$/H1SP), and Host 2 22B includes modified data records having the Device/Host synchronization parameter pair for Host 2 ($DSP_{H2}$/H2SP).

At time t=0 (step 50) the data record 30 to be updated is synchronized at the Device 12 and both Hosts (Host 1, Host 2) 22A, 22B. This data record 30 has been modified at the Device 12 to include the Device/Host synchronization parameter pair for Host 1 22A ($DSP_{H1}$/H1SP) and the Device/Host synchronization parameter pair for Host 2 22B ($DSP_{H2}$/H2SP). The corresponding data record 30 at Host 1 22A has been modified to include the Device/Host synchronization parameter pair for Host 1 ($DSP_{H1}$/H1SP) and the corresponding data record 30 at Host 2 22B has been modified to include the Device/Host synchronization parameter pair for Host 2 ($DSP_{H2}$/H2SP).

At time t=A, the data record 30 at Host 1 22A is updated to $DR_{H1U}$, and the Host 1 22A synchronization parameter (H1SP) is incremented to H1SP+1. Similar to the process described above, an update message 88A is then transmitted from Host 1 22A to the Device 12. This update message 88A includes the Device synchronization parameter for Host 1 ($DSP_{H1}$), the new Host 1 synchronization parameter (H1SP+1), and the updated data record ($DR_{H1U}$).

The Device 12 receives the update message 88A at time t=B (step 84), and examines the DSP value to determine if there is a conflict. Since the DSP value from the Host is the same as the DSP value stored at the Device 12, no conflict is detected, and thus the Device simply accepts the update message from Host 1. In so doing, the data record 30 stored at the Device database 14 is updated to be $DR_{H1U}$, and the Host 1 synchronization parameter (H1SP) stored at the Device 12 is incremented to H1SP+1. Because the data record 30 has been updated at the Device 12, the Device synchronization parameters ($DSP_{H2}$) for the other Hosts (Host 2) that did not initiate the update message 88A are incremented by 1, and another update message 88B is generated. This second update message 88B is transmitted from the Device 12 to the other Hosts (Host 2), and includes the new Device synchronization parameter ($DSP_{H2}$+1), the corresponding Host synchronization parameter (H2SP), and the updated data record ($DR_{H1U}$) that was transmitted from the master Host system (Host 1) 22A.

At step 86, the other Hosts (Host 2) receives the second update message 88B and first determines whether a conflict exists by comparing the transmitted Host synchronization parameter (H2SP) with that stored at the respective other Host. Assuming no conflict exists, the other Host(s) (Host 2) accepts the changes from the update message, increments the corresponding Device synchronization parameter $DSP_{H2}$, and stores $DR_{H1U}$ as the updated data record. In this manner, an update at Host 1 is synchronized to both the Device 12 and any other Hosts (Host 2) that are being synchronized via the system.

Figure 7:
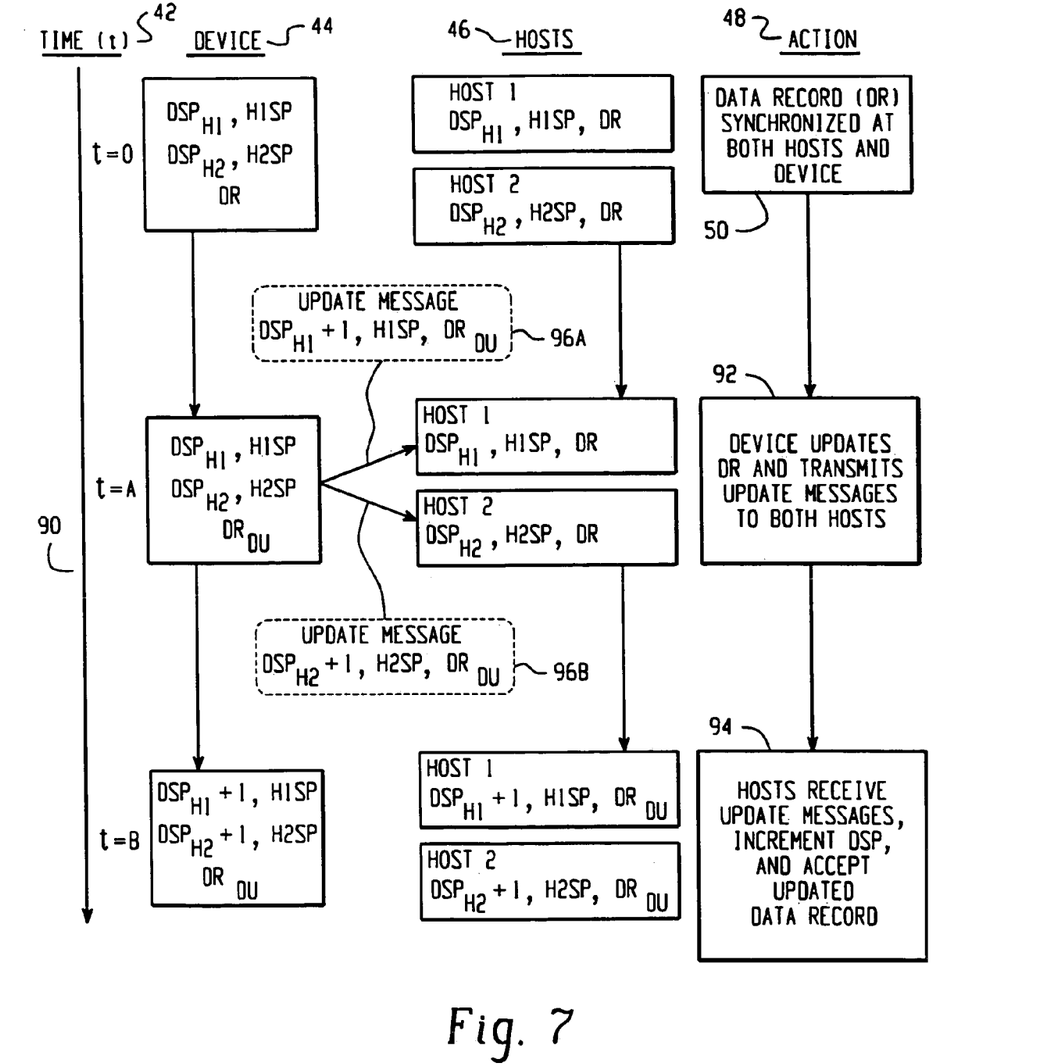
FIG. 7 is a timing flow diagram showing a method of data record synchronization between a plurality of Host systems and a portable data communication Device, wherein the data record is updated at the portable data communication Device.

FIG. 7 is a timing flow diagram 90 showing a method of data record synchronization between a plurality of Host systems 22A, 22B, 22C and a portable data communication Device 12, wherein the data record 30 is updated at the portable data communication Device 12. At step 50, the data record to be updated is synchronized at the Hosts (Host 1, Host 2) 22A, 22B and the portable Device 12. As described above, the Device 12 includes data records 30 modified to include the Device/Host synchronization parameter pair (DSP/HSP) for each Host that it is being synchronized with. The respective Hosts include data records 30 modified to include the respective Device/Host synchronization parameter pair (either $DSP_{H1}$, H1SP or $DSP_{H2}$, H2SP).

At step 92, the Device 12 updates the data record DR to $DR_{DU}$, and increments both Device synchronization parameters $DSP_{H1}$, $DSP_{H2}$. Then, the Device 12 generates two update messages 96A, 96B, one for the first Host (Host 1) 96A, and another for the second Host (Host 2) 96B. The update message 96A transmitted to Host 1 includes the incremented DSP for Host 1, the Host 1 synchronization parameter (H1SP) stored at the Device 12, and the updated data record $DR_{DU}$. Likewise, the update message 96B transmitted to Host 2 includes the incremented DSP for Host 2, the Host 2 synchronization parameter (H2SP) stored at the Device 12, and the updated data record $DR_{DU}$.

At step 94, the Hosts receive the update messages 96A, 96B and examine the respective Host synchronization parameters in the update message 96A, 96B to determine if any conflict exists. Assuming that there is no conflict, the Hosts accept the update information by storing $DR_{DU}$ as the new data record and by incremented the respective Device synchronization parameters $DSP_{H1}$, $DSP_{H2}$.

Figure 8:
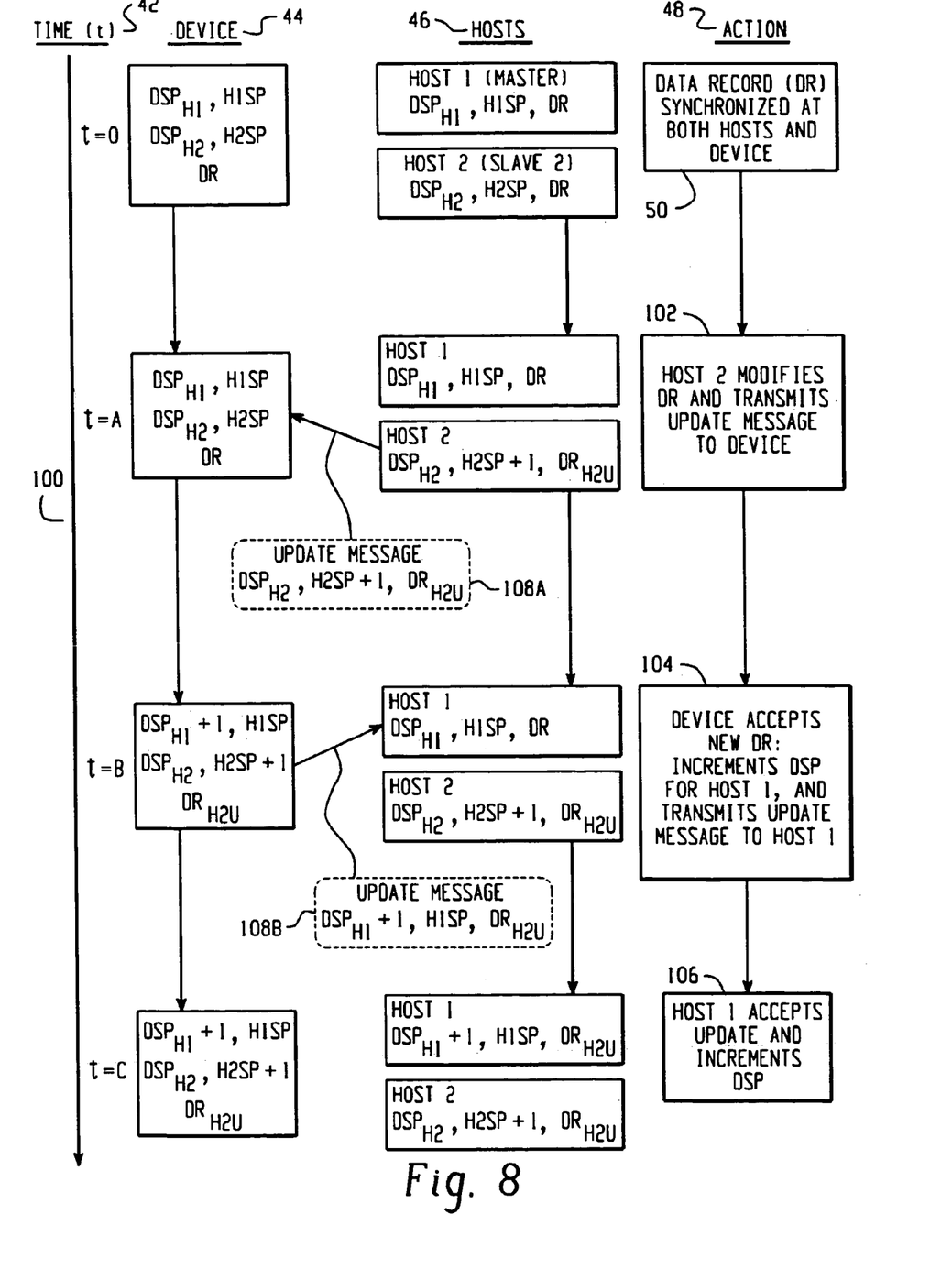
FIG. 8 is a timing flow diagram showing a method of data record synchronization between a plurality of Host systems and a portable data communication Device, wherein the data record is updated at the slave Host system.

FIG. 8 is a timing flow diagram 100 showing a method of data record synchronization between a plurality of Host systems 22A, 22B, 22C and a portable data communication Device 12, wherein the data record is updated at a second-level slave Host system. Recall from the description above that the master-slave architecture of the present invention may configure one of the Hosts as the master and the Device as a first level slave that is controlled by update messages from the Host master. The remaining Hosts are then configured as second-level slaves that are controlled by update messages from the first-level slave Device 12. This is the configuration shown in FIG. 8.

At step 50, the Hosts 22A, 22B and the Device are synchronized. At step 102, the second-level slave Host (Host 2) updates a particular data record DR to $DR_{H2U}$. The corresponding Host synchronization parameter H2SP is incremented to H2SP+1, and an update message 108A is transmitted from the second-level slave (Host 2) to the first level slave (Device) 12, including the DSP for Host 2, the updated HSP, and the update data record $DR_{H2U}$.

At step 104, the first-level slave Device 12 receives the update message 108A and verifies that there is no conflict by comparing the transmitted DSP ($DSP_{H2}$) with the DSP stored at the Device for this particular data record. Assuming there is no conflict (i.e., the DSPs are the same value), the Device 12 accepts the new data record $DR_{H2U}$ and increments the Host synchronization parameter at the Device 12 to be the same as that stored at Host 2. Having updated its data record 30, the Device, as a first-level slave to the master (Host 1), then updates the DSP for Host 1 ($DSP_{H1}$) and transmits a second update message 108B to Host 1 including the incremented Device synchronization parameter ($DSP_{H1}$+1), the Host synchronization parameter for Host 1 (H1SP), and the updated data record from Host 2 ($DR_{H2U}$). As shown in FIG. 3, the master Host then verifies that no conflict exists by comparing the Host-side HSP with the HSP transmitted in the update message 108B. Assuming there is no conflict, at step 106 the Host accepts the new data record $DR_{H2U}$, and increments the Device synchronization parameter $DSP_{H1}$ so that it is synchronized with the Device.

Figure 9:
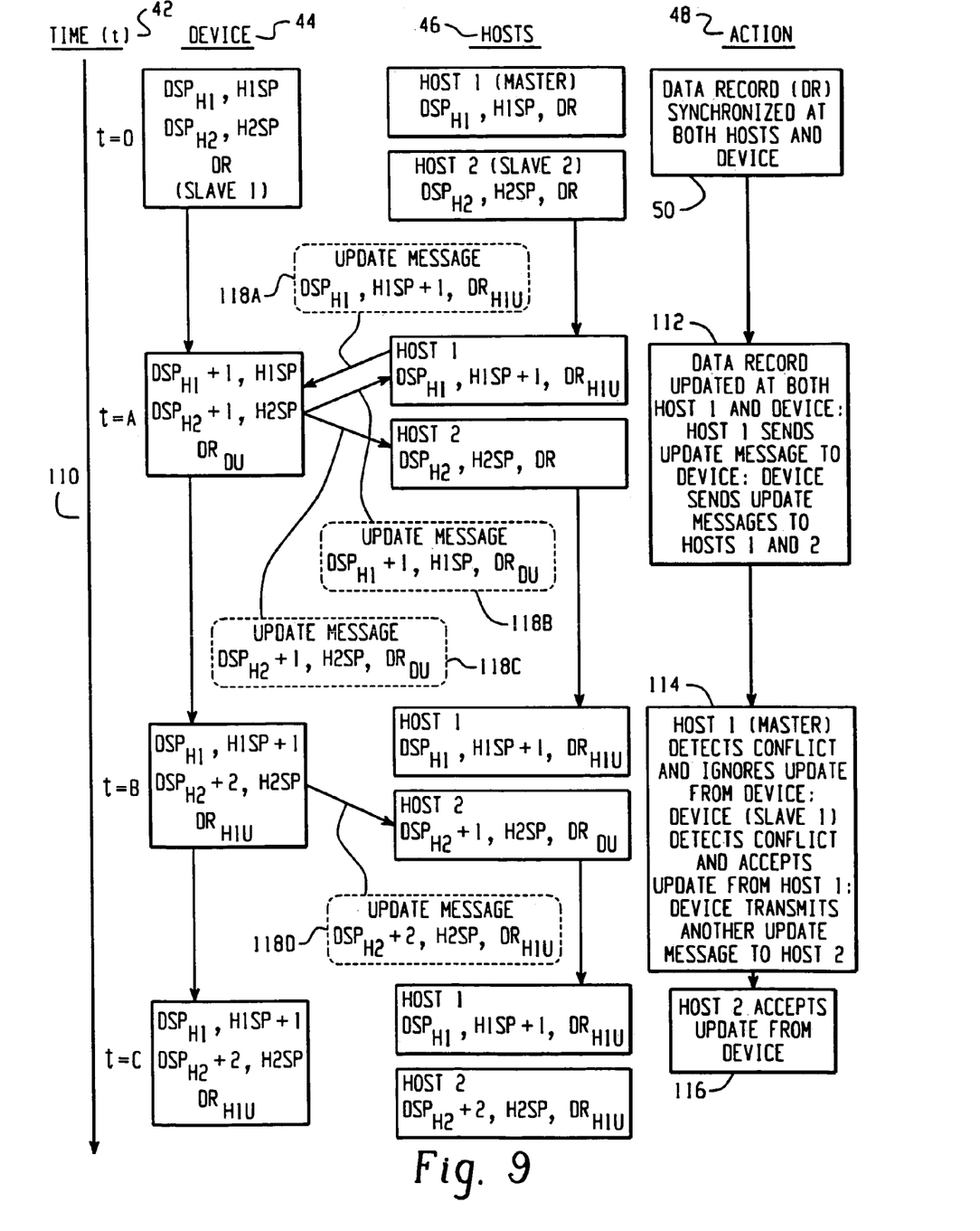
FIG. 9 is a timing flow diagram showing a method of data record synchronization and conflict resolution between a plurality of Host systems and a portable data communication Device, wherein the data record is simultaneously updated by the master Host system and the portable data communication Device.

FIG. 9 is a timing flow diagram 110 showing a method of data record synchronization and conflict resolution between a plurality of Host systems 22A, 22B, 22C and a portable data communication Device 12, wherein the data record is simultaneously updated by the master Host system 22A and the portable data communication Device 12. As with FIGS. 6, 7 and 8, at step 50 of FIG. 9 the data record to be updated is synchronized at the Host systems (Host 1, Host 2) and the Device 12. At step 112, the data record 30 is simultaneously updated at the master (Host 1) and at the slave Device 12. In so doing, the master (Host 1) updates the data record to $DR_{H1U}$, increments the Host 1 synchronization parameter (H1SP), and transmits an update message 118A to the Device 12 that includes the updated data record ($DR_{H1U}$), the updated Host 1 synchronization parameter (H1SP), and the Device synchronization parameter for Host 1 $DSP_{H1}$ that is stored at the Host 1 database 24A. Likewise, the slave Device 12 updates data record to $DR_{DU}$, increments the Device synchronization parameters for Host 1 ($DSP_{H1}$) and Host 2 ($DSP_{H2}$), and transmits two update messages containing this information, one message 118B containing the Host 1 synchronization information, and a second message 118C containing the Host 2 synchronization information.

At step 114, Host 1 receives the update message 118B from the slave Device 12, and detects a conflict since the transmitted Host 1 synchronization parameter (H1SP) in the message 188B is less than the H1SP stored at the Host 1 database. Therefore, since the Host is the master in this example, the update message 118B from the slave Device 12 is ignored. At the same time, Host 2 also receives the update message 118C from the slave Device. Here, however, there is no conflict, and thus Host 2 accepts the update message 118C, stores the new data record $DR_{DU}$, and increments the Device synchronization parameter stored at Host 2 ($DSP_{H2}$). Also at the same time, the Device 12 receives the update message 118A from the master Host 1. The Device 12 detects the conflict by comparing the transmitted DSP to the DSP stored at the Device 12, which was previously incremented. Detecting the conflict, the software operating at the slave Device 12 accepts the updated data record $DR_{H1U}$ from the Host, increments the Host 1 synchronization parameter (H1SP), and decrements the DSP value for Host 1 so that it is synchronized with the DSP value stored at the Host 1 database. In addition, because the data record has been updated a second time at the Device 12, the DSP for Host 2 is incremented again to $DSP_{H2}+2$, and another update message 118D is transmitted to Host 2 including the new data record $DR_{H1U}$, the updated DSP ($DSP_{H2}$), and the Host 2 synchronization parameter (H2SP).

Finally, at step 116, Host 2 receives the update message 118D and stores the updated data record $DR_{H1U}$ in its database. The Device synchronization parameter at Host 2 ($DSP_{H2}$) is then incremented so that it is in synchronization with the DSP for Host 2 stored at the Device 12.

The preferred embodiments described with reference to the attached drawing figures are presented only to demonstrate certain examples of the invention. Other elements, steps, methods and techniques that are insubstantially different from those described above and/or in the appended claims are also intended to be within the scope of the invention.

What is claimed is:

1. A method of synchronizing data records stored in a host system and a device system, comprising the steps of:
    associating a first device synchronization parameter and a first host synchronization parameter with a data record stored at the host system;
    associating a second device synchronization parameter and a second host synchronization parameter with a data record stored at the device system;
    updating the first host synchronization parameter when the data record is updated at the host system and transmitting a first update message from the host system to the device system; and
    updating the second device synchronization parameter when the data record is updated at the device system and transmitting a second update message from the device system to the host system;
    wherein the first and second host synchronization parameters are indicative of versions of data records stored at the host system, and the first and second device synchronization parameters are indicative of versions of records store at the device system.

2. The method of claim 1, wherein the first update message includes the updated first host synchronization parameter and the first device synchronization parameter.

3. The method of claim 1, wherein the second update message includes the updated second device synchronization parameter and the second host synchronization parameter.

4. The method of claim 1, further comprising:
    receiving the first update message at the device system;
    detecting for conflicts between the updated data record at the device system and the data record at the host system; and
    ignoring the updated data record if there is a conflict detected.

5. The method of claim 1, wherein the device system comprises a mobile communication device.

6. A system for synchronizing data records stored in a host system and a device system, comprising the steps of:
    means for associating a first device synchronization parameter and a first host synchronization parameter with a data record stored at the host system;
    means for associating a second device synchronization parameter and a second host synchronization parameter with a data record stored at the device system;
    means for updating the first host synchronization parameter when the data record is updated at the host system and transmitting a first update message from the host system to the device system; and
    means for updating the second device synchronization parameter when the data record is updated at the device system and transmitting a second update message from the device system to the host system;
    wherein the first and second host synchronization parameters are indicative of versions of data records stored at the host system, and the first and second device synchronization parameters are indicative of versions of records store at the device system.

* * * * *